April 8, 1952 W. H. KORN 2,592,294
BEARING
Filed July 10, 1948 2 SHEETS—SHEET 1

INVENTOR.
Waldemar H. Korn
BY Sheridan Davis & Cargill
Attorneys

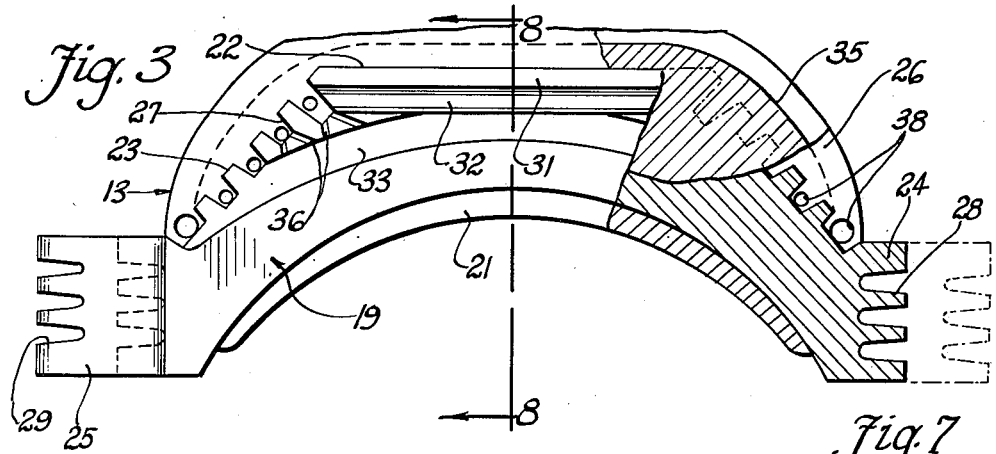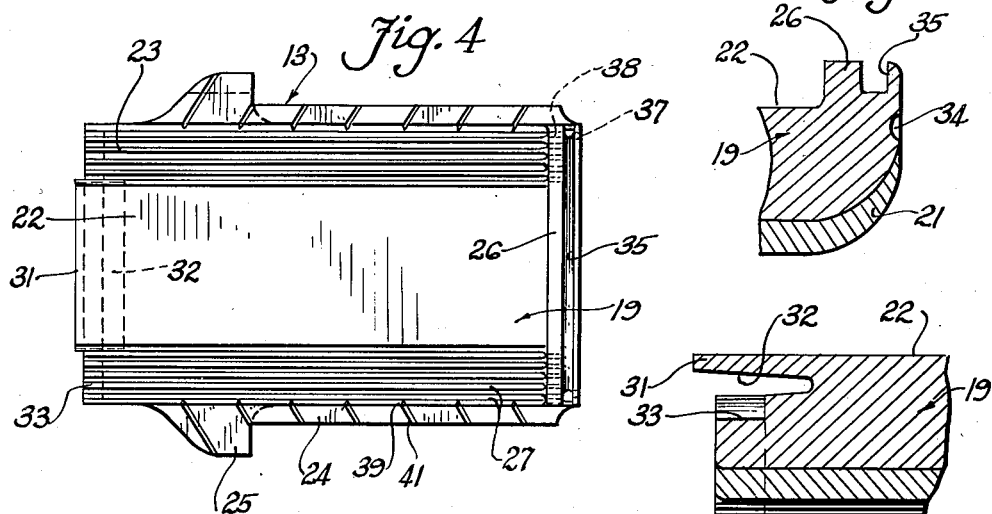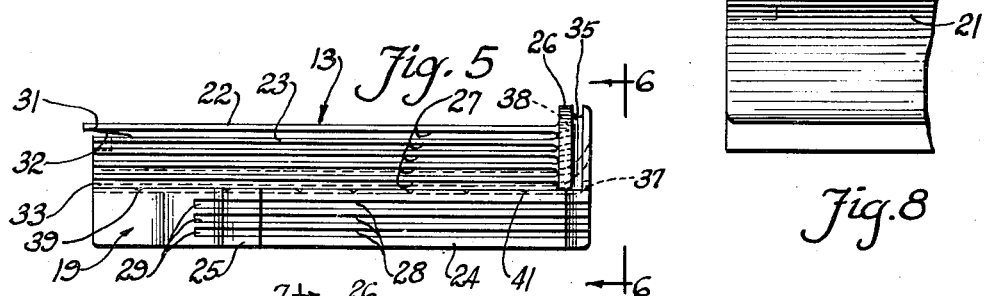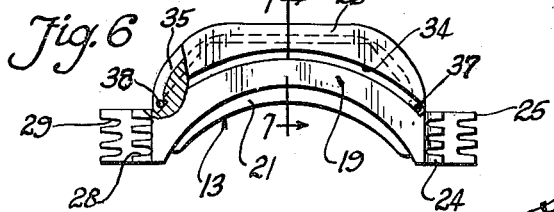

Patented Apr. 8, 1952

2,592,294

UNITED STATES PATENT OFFICE 2,592,294

BEARING

Waldemar H. Korn, Dubuque, Iowa, assignor to Kornlube Products, Chicago, Ill., a copartnership Application July 10, 1948, Serial No. 38,142

9 Claims. (Cl. 308—76)

This invention relates in general to bearings and more particularly to railway journal bearings.

A principal object of the invention is to reduce the running temperature of lined journal bearings or "brasses" by so constructing the brass as to cause the excess or surplus lubricating oil normally carried upwardly by the journal from the bottom of the box to be collected automatically by the brass and flowed over the outer surfaces thereof, whereby such surplus oil will cool the bearing instead of merely being deflected outwardly away from the bearing and onto the adjacent inner surfaces of the journal box in the manner customary with the conventional journal bearing.

The most vulnerable part of a journal bearing of this type, from the standpoint of failure of the lining due to overheating, is the crown portion thereof, since the load carried or transmitted by the bearing to the journal is concentrated at the crown of the bearing. It has been found, however, that the running temperature of a conventional journal bearing normally is somewhat higher at the crown than it is at the leading or trailing edges of the bearing.

An important object of this invention, therefore, in addition to reducing the overall running or operating temperature of such bearings, is to so cool the bearing as to lower the temperature at the crown to that prevailing at the leading and trailing edges of the bearing, so as to further insure against failure of the lining.

Another important object of the instant invention is to provide a journal bearing, having a conventional lining, with longitudinally extending grooves in the outer side surfaces of the brass and means at the ends of the brass for collecting the surplus lubricating oil normally carried upwardly by the journal and delivering it to such longitudinal grooves, so that the excess oil will flow over the outer surfaces of the bearing to cool the same, and also to increase the circulation of said lubricant to the vital areas of the bearing and return the oil to the rotating journal rather than distribute the oil to the various inside surfaces of the journal box.

A further object of the invention is the provision of such surplus oil collection means at the outer end of the bearing in the form of a shelf formed integrally with the outer end of the brass and extending over the collar or flange normally provided on the journal so as to catch the excess lubricating oil thrown centrifugally therefrom, the shelf being vertically spaced from the collar of the journal sufficiently to prevent contact therewith even if the lining of the bearing is completely worn down.

Another object is to provide such surplus oil collection means in the form of a groove in both end surfaces of the brass above, and concentric with, the journal for trapping excess oil flowing onto such end surface directly from the journal and journal collars, and a circumferential groove in the upper surface of the usual inner end flange on the brass for collecting surplus oil sprayed onto the top inner wall of the journal box by the journal.

A further object of this invention is the provision of oil delivery means in the form of appropriate grooves and apertures interconnecting such collection means and the longitudinal grooves in the outer surfaces of the brass, so that the surplus lubricating oil collected by the former will be directed therefrom into the longitudinal grooves and thereby over all exposed outer surfaces of the bearing.

Another object of the invention is to provide such an improved journal bearing which is comparable in cost to that of the conventional journal bearing, the weight of the brass being so much less than that of the conventional bearing that the additional manufacturing cost is less than the differential cost of the metal.

Numerous other objects and advantages of the invention will be apparent as it is better understood from the following description, which, when taken in connection with the accompanying drawings, discloses a preferred embodiment thereof.

In the drawings:

Fig. 3 is an enlarged elevation of the outer end of the journal bearing showing portions thereof in detailed vertical section;

Fig. 4 is a top plan view of the instant bearing;

Fig. 5 is a side elevation of the bearing;

Fig. 6 is a view of the inner end of the bearing, as seen from the line 6—6 of Fig. 5;

Fig. 7 is a detailed vertical section taken substantially on the line 7—7 of Fig 6; and Fig. 8 is a detail vertical section taken substantially on the line 8—8 of Fig. 3.

Figure 1:
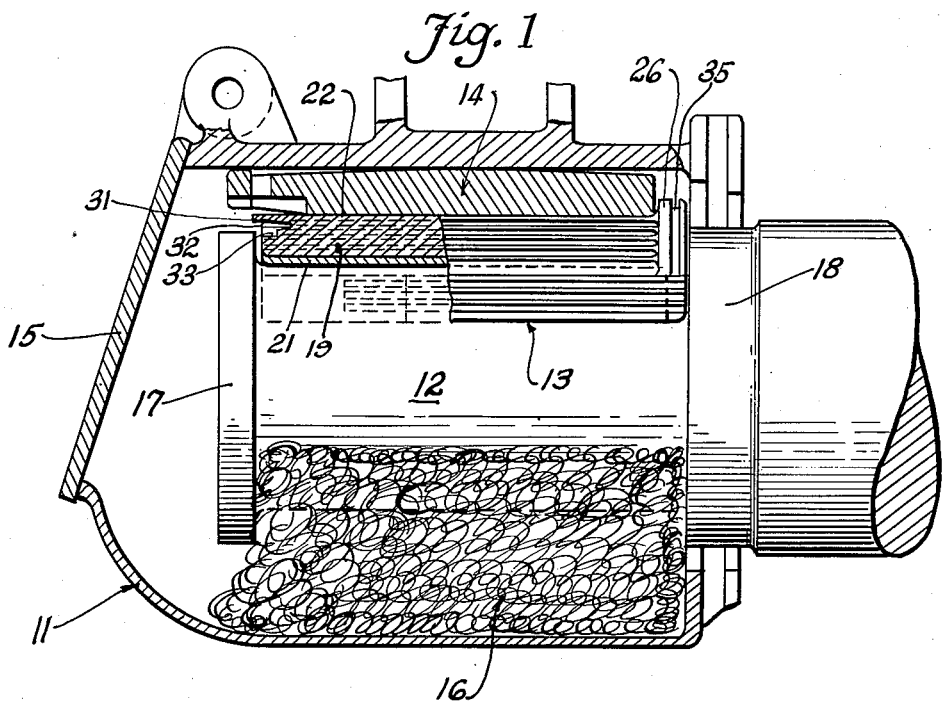
Figure 1 is a longitudinal vertical section through a journal box showing a bearing embodying the features of the instant invention therein with one end thereof in elevation.

Referring more particularly to the drawings, reference numeral 11 indicates in general a journal box of standard and well-known construction within which is housed one end of a journal 12 in the usual manner. Reference numeral 13 indicates generally a journal bearing embodying the features of the instant invention which is adapted to be mounted on the journal 12 in well-known manner with the usual wedge 14 interposed between the bearing and the upper wall of the journal box 11. As illustrated in Fig. 1, the journal box 11 is provided with a suitable pivoted cover plate 15, and standard waste 16, or any other suitable type of lubricating means, is interposed between the under surface of the journal 12 and the bottom of the box 11. As is well known in the art, this waste packing 16 is adapted to supply lubricating oil from the bottom of the journal box 11 to the underside of the journal 12. During rotation of the journal, the outer surface of the end portion thereof in the journal box in contact with the waste pack 16 will carry the lubricating oil supplied thereto by the waste to the inbound side of the journal bearing 13 for lubricating the bearing surface thereof.

Figure 2:
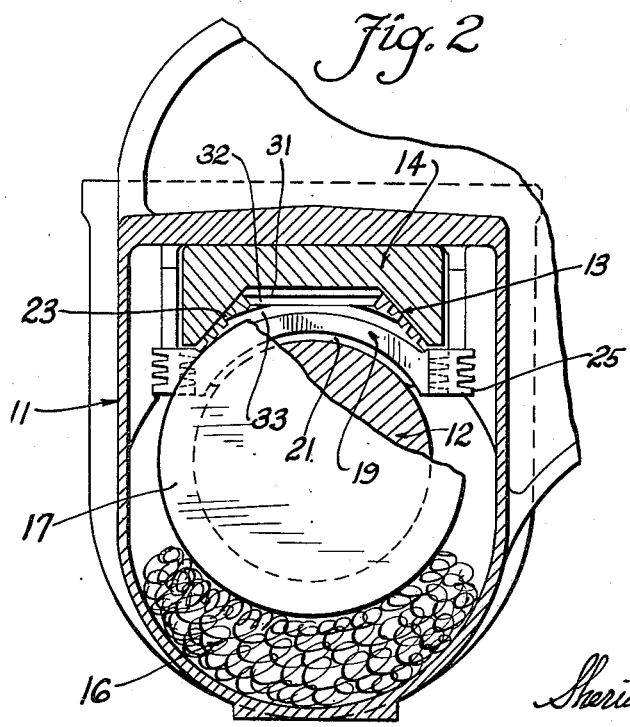
Fig. 2 is a vertical sectional view taken transversely through the journal box of Fig. 1, as seen from the outer end thereof, and showing the journal bearing in end elevation.

As illustrated in Fig. 2, the wedge 14 is shaped in cross section in the usual manner to cooperate with the upper and sloping side surfaces of the brass of the journal bearing 13 and with the standard side ribs of the journal box 11 to prevent lateral tipping of the bearing. The latter is interposed in the customary manner between the usual outer end flange or collar 17 and inner flange or collar 18 of the journal 12, as shown in Fig. 1, and the journal box 11, being of standard construction, may be provided with any suitable type of dust guard at its inner end for cooperation with the flange 18 of the journal to prevent the entry of foreign material into the box. The instant invention comprises a novel journal bearing, which is of standard construction except for the addition thereto of means for automatically collecting and circulating excess or surplus lubricating oil carried upwardly by the journal and flowing such surplus oil over its outer surfaces, in a manner to be described in detail hereinafter, to cool the bearing and materially reduce its normal running or operating temperature. Consequently, the present invention is directed specifically to the journal bearing 13, and the particular type of lubricating means herein illustrated as employed for supplying oil to the outer surface of the journal forms no part thereof, it being understood that any other desired means may be employed for performing this oil supplying or delivery function to the rotating journal and its bearing other than the ordinary waste pack 16 shown in Figs. 1 and 2.

Referring more particularly to Figs. 3 to 8, the instant journal bearing 13 comprises a backing member or "brass" 19 having the usual babbitt or other relatively soft lining 21 adhered in well-known manner to the curved under surface thereof for contact with the outer surface of the journal 12. The brass or backing member 19 has the usual or standard outer configuration including a horizontal upper surface 22, sloping side surfaces 23, lateral flanges 24 terminating at their forward ends in outwardly extending wings 25, and the usual vertically disposed thrust flange 26 at the inner end thereof.

Each of the sloping side surfaces 23 of the instant journal bearing 13 is provided with a plurality of longitudinally extending grooves 27 cast or machined therein and extending from the outer end of the bearing into close proximity to the thrust flange 26. Similar longitudinal grooves 28 are provided in the outer vertical surfaces of each of the lateral flanges 24, and longitudinal grooves 29 aligned therewith likewise are provided in the wings 25. Since these wings 25 have a longitudinal thrust-preventing function, cooperating with the journal box 11 to limit inward movement of the bearing 13 relative to the journal box, these latter longitudinal grooves 29 are limited in depth so as not to impair the thrust resisting or shear strength of the wings 25. By directing the flow of excess lubricating oil into and through these several longitudinal grooves and over the outer surfaces of the bearing backing member 19 in which they are disposed, the journal bearing 13 is effectively cooled and the normal running or operating temperature thereof is materially reduced.

Means are provided for automatically collecting and increasing the circulation of the surplus or excess lubricating oil carried upwardly by the journal 12 and its collars or flanges 17 and 18 to the bearing 13 and for directing the same into these longitudinal grooves. At the outer end of the bearing 13, this excess oil collecting and circulating means comprises a horizontal shelf 31, a horizontal groove or slot 32 undercutting this shelf, and an arcuate groove 33 (Fig. 3) which is concentric with the lower bearing surface of the lining 21 and intersects the horizontal groove 32 at its central portion. As best seen in Fig. 1, the shelf 31 extends outwardly from and is formed integrally with the inner end of the brass or backing member 19, the upper surface 22 of the backing member. The lower surface of the shelf 31, when the bearing 13 is mounted in operative position on the journal 12, is spaced above the outer end flange 17 of the journal a sufficient distance to prevent contact with the flange in the event that the soft metal lining 21 is completely worn down so that the crown of the brass 19 is in contact with the journal 12. At the inner end of the bearings (Figs. 6 and 7) the surplus oil collecting and circulating means comprises an arcuate groove 34 which is substantially identical to the arcuate groove 33 in the outer end surface of the bearing, also being concentric with the lower bearing surface of the lining 21. The surplus oil collecting and circulating means further includes a vertically disposed groove 35 in the thrust flange 26 which functions to collect excess oil carried upwardly by the journal 12 which is thrown against the upper surface of the journal box 11 and drips downwardly therefrom onto the thrust flange 26. As is best seen in Figs. 5 and 7, the lower or bottom surface of this groove 35 is spaced sufficiently above the top surface 22 of the backing member as not to impair the thrust-resisting function of the flange 26. The shelf 31 functions as a splash plate against which some of the excess oil carried upwardly by the journal 12 is thrown, and such oil is thereby collected in the groove 32. The arcuate grooves 33 and 34 are so disposed as to entrap and circulate some of the excess lubricating oil carried upwardly by the journal and collars 17 and 18, since such oil will flow or be forced upwardly along the end surface of the bearing from the inbound side thereof due to centrifugal force of the rotating journal. Since the journal 12 will rotate in one direction under some conditions of operation, and in the opposite direction under other circumstances, either side of the bearing 13 at certain times may comprise the inbound side thereof. Regardless of the direction of rotation of journal 12, however, these arcuate grooves 33 and 34, as well as the shelf 31 and its associated groove 32 and the vertical groove 35, always will function in the same manner to entrap and collect and circulate the major portion of the lubricating oil carried upwardly by the rotating journal 12 from the waste packing 16 or other lubricating means which is in excess of that required to lubricate the bearing surface of the lining 21.

As best seen in Fig. 3, each of the uppermost longitudinal grooves 27 communicate directly at their outer ends with the ends of the horizontal groove 32, and the three lowest longitudinal grooves 27 in each side sloping surface 223 similarly communicate directly at their outer ends with the arcuate groove 33. In order to direct some of the excess oil collected at the outer end of the bearing into the remaining longitudinal grooves 27, transverse grooves 36 (Fig. 3) may be cut or formed in the outer end surface of the backing member 19, which interconnect the outer ends of the two uppermost longitudinal grooves 27 on each side of the bearing and the arcuate groove 33. These transverse grooves 36 are angularly disposed in pairs, as illustrated in Fig. 3, so as to best direct some of the excess lubricating oil collected in the arcuate groove 33 into the related longitudinal grooves 27 regardless of the direction of rotation of the journal 12. As best seen in Figs. 4, 5 and 6, the lower ends of the arcuate groove 34 in the inner end surface of the bearing are inter-connected with the lower ends of the vertical and radial disposed or arcuate groove 35 by means of apertures 37. Thus the surplus oil collected in this inner end groove 34 is directed into the vertical and radial or arcuate disposed groove 35. For inter-connecting the inner ends of each of the longitudinal grooves 27 with the vertical and radial disposed groove 35, a plurality of apertures 38 are formed in, or drilled through, the thrust flange 26 which slope downwardly from the bottom surface of the groove 35 to facilitate drainage and circulation of the surplus oil collected therein into the several longitudinal grooves 27. Any surplus oil collected in the vertical and radial or arcuate disposed groove 35 escaping from the lower ends thereof, will flow into the inner ends of the longitudinal grooves 27 in the lateral flanges 24 of the brass. As the surplus oil thus collected and directed into the longitudinal grooves 27 flows therefrom and over the sloping side surface 23 of the bearing, means are provided for distributing the same evenly over the vertical surface of the lateral flanges 24. This latter directing means comprises a plurality of notches or grooves 39 (Fig. 4 and 5) extending through the lower marginal edges of the sloping side surface 23, which communicate at their outer ends, respectively, with a plurality of transverse slots 41 formed in the upper surface of the lateral flanges 24 and thrust-resisting wings 25. As shown in Fig. 3, it is preferred that the two lowermost apertures 38 inter-connecting the lower ends of the vertical and radial or arcuate disposed groove 35 and the lowest longitudinal grooves 27, be larger in diameter than the remaining apertures 37, so as to insure a reasonable portion of the excess lubricating oil collected being directed into these lower longitudinal grooves 27, through the notches 39 and slots 41, and down the outer vertical surfaces of the lateral flanges 24 and wings 25 into the longitudinal grooves 28 and 29.

While the several groups of longitudinal grooves 27, 28 and 29 have the appearance of heat-radiating fins, their intended function is not that of radiation of heat from the bearing to the ambient air, since, as will be appreciated by those skilled in the art, there is, and can be, very little flow of air through the journal box 11. Rather, the above-described construction is given the instant journal bearing solely for the purpose of employing the excess or surplus lubricating oil, which normally is carried upwardly by the journal 12 as a cooling medium, whereby such excess oil is automatically entrapped and collected and circulated substantially uniformly over the outer surfaces of the journal bearing. It will be appreciated by those skilled in the art that the grooves 27, 28 and 29 have very considerably increased the outer surfaces of the brass 19 and that, by causing the flow of lubricant over these increased surfaces, greater heat dissipation results. Consequently, the cooling obtained with the instant journal bearing may be termed "liquid cooling," since the movement of air through the journal box 11 is very slight. The only air moving through the journal box comes through the dust board well or area at the inner portion of the journal box, due to the loose fitting arrangement of the dust board, and under the lid, as the standard lids do not seal satisfactorily, and this air has some movement imparted to it by the rotation of the journal or axle 12.

In practical tests under operating conditions, it has been found that the normal running temperature of the instant journal bearing is from 15 to 20 percent lower than that of a standard journal bearing of the same size under identical operating conditions of maximum speed and loads. What is perhaps of more importance, however, is that the running temperature at the crown of the instant journal bearing is substantially identical with those existing at both the leading and trailing edges of the bearing under all possible types of operating conditions. As previously mentioned herein, that portion of any journal bearing of this type most susceptible to wear and most vulnerable to excessive temperatures is the crown portion. Yet, in standard journal bearings of this type, the normal running temperature at the crown always is materially higher while operating at high speeds than that at the inbound and outbound or leading and trailing edges. Consequently, the reduction of the running or operating temperature at the crown portion of the bearing to that which obtains at the edges thereof, as results with the instant bearing, constitutes a very decided advantage and, in view of the additional overall reduction of the running or operating temperatures, reduces lining failure due to overheating of the bearing to a minimum.

It is preferred that the instant backing member 19 be made by die casting, whereby the excess oil collecting, directing and distributing means, or part thereof, may be formed directly therein. However, whether this or some other method of manufacture is employed, the increased cost thereof, compared with the cost of a conventional brass of the same size, is more than offset by the resultant saving or reduction in weight of the present brass 19. This difference in weight is approximately 15 percent, a brass of the instant construction weighing only 21 pounds, as compared with a conventional brass having the same dimensions, which weighs 25 pounds. Since brasses customarily are sold by the pound, this 4 pound saving is very material. This is only an incidental feature of the present bearing, of course; the primary feature being the resulting materially lower running temperatures, which are approximately 20 percent less than those of standard bearings of the same sizes under the same conditions, together with the reduction of the temperature at the crown to that at the leading and trailing edges.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment of the invention.

I claim:

1. A journal bearing for transmitting a load between any standard journal and journal box having stationary oil supply means interposed between the lower portion of the latter and the journal for supplying lubricating oil to the journal, comprising a backing member having a plurality of parallel longitudinal circulating grooves in the outer side surfaces thereof for guiding the flow of oil from at least one end of said backing member over said outer surface for cooling the bearing, and means formed integrally with at least one end of said backing member and communicating directly with the adjacent ends of at least some of said longitudinal circulating grooves for collecting excess oil delivered to the journal by said oil supply means and carried upwardly by the journal and for delivering such excess oil to said circulating grooves to cool the bearing.

2. A journal bearing for transmitting a load between any standard journal and journal box having stationary oil supply means interposed between the lower portion thereof and the journal for supplying lubricating oil to the latter, comprising a backing member having a plurality of longitudinal grooves in the outer surfaces thereof for guiding the flow of oil from at least one end of said backing member over the latter to cool the bearing, means formed integrally with an end of said backing member for collecting excess lubricating oil delivered to the journal by said oil supply means and carried upwardly by the journal, and said backing member having delivery means formed therein for delivering the excess oil collected by said last means to the adjacent ends of at least some of said plurality of longitudinal grooves.

3. In combination with a journal extending into a journal box having means interposed between the lower portion thereof and the journal for supplying lubricating oil to the latter, a journal bearing interposed between said journal and the upper portion of said journal box, comprising a backing member having a plurality of longitudinal grooves in the outer surfaces thereof for guiding the flow of oil over said outer surfaces to cool the bearing, and means formed at both ends thereof for collecting surplus oil carried upwardly by the journal and delivering the same to said plurality of longitudinal grooves.

4. In combination with a journal extending into a journal box having means interposed between the lower portion thereof and the journal for supplying lubricating oil to the latter, a journal bearing interposed between said journal and the upper portion of said journal box, comprising a backing member having a plurality of longitudinal grooves in the outer side surfaces thereof for guiding the flow of oil over said surfaces to cool the bearing, grooves formed in the end surfaces thereof for collecting surplus oil carried upwardly by the journal, and means formed therein for delivering the surplus oil collected by said end grooves to said longitudinal grooves.

5. A journal bearing adapted to be mounted upon a journal having means associated therewith for delivering lubricating oil thereto to be carried upwardly to the bearing by the journal during rotation thereof, comprising a backing member having a plurality of longitudinal grooves formed in the outer side surfaces thereof for guiding the flow of oil over said surfaces to cool the bearing, a shelf formed integrally with said backing member and extending outwardly from an end thereof for deflecting excess oil carried upwardly by the journal, said backing member having a groove formed in the end thereof adjacent to and below said shelf for collecting such deflected surplus oil, and said end groove being interconnected with said longitudinal grooves so as to deliver the surplus oil collected thereby to the latter.

6. A journal bearing adapted to be mounted on a journal having lubricating means associated therewith for delivering oil thereto to be carried upwardly thereby to the bearing, comprising a backing member having a curved groove formed in one end thereof concentric with said journal and spaced upwardly therefrom for collecting excess lubricating oil carried upwardly by the journal, and guide means formed integrally with said backing member and interconnected with said end groove for directing the excess oil collected in the latter over the outer side surfaces of the backing member to cool the bearing.

7. In a journal bearing adapted to be interposed between a journal and a journal box into which one end of the journal extends and having stationary means interposed between the journal and the lower portion thereof for supplying lubricating oil to the journal to be carried upwardly thereby to the bearing; a backing member having a plurality of longitudinal grooves in the outer side surfaces thereof for guiding the flow of oil over said outer surfaces to cool the bearing and a vertically disposed groove extending transversely across the upper and side surfaces thereof adjacent the inner end of the bearing for collecting excess oil carried upwardly by the journal and thrown thereby against the upper surfaces of said journal box, said vertically disposed groove being interconnected with one end of at least some of said longitudinal grooves to deliver the surplus oil collected thereby to the latter.

8. In a journal bearing adapted to be mounted on a journal having lubricating means associated therewith for delivering oil thereto to be carried upwardly thereby to the bearing, a backing member having a curved groove formed in each of the end surfaces thereof concentric with said journal and spaced upwardly therefrom for collecting excess lubricating oil carried upwardly by the journal, a plurality of longitudinal grooves in the outer side surfaces thereof for guiding the flow of oil over said outer surfaces to cool the bearing, and means interconnecting said plurality of longitudinal grooves and said end grooves for directing the excess oil collected in the latter into the former.

9. In a journal bearing adapted to be mounted on a journal having an end extending into a journal box having means interposed between the journal and the lower portion thereof for supplying lubricating oil to the journal to be carried upwardly thereby to the bearing; a backing member having a plurality of longitudinal grooves in the outer side surfaces thereof for guiding the flow of oil over said outer surfaces to cool the bearing, a curved groove formed in each of the end surfaces thereof concentric with said journal and spaced upwardly therefrom for collecting excess lubricating oil carried upwardly by the journal, a shelf formed integrally with the outer end thereof and extending outwardly above the end of said journal for deflecting excess oil into said curved groove in the outer end thereof, transverse grooves formed in the outer end thereof interconnecting said outer end curved groove and said plurality of longitudinal grooves for guiding the excess oil collected in the former into the latter, a vertically disposed groove extending transversely across the upper and side surfaces thereof adjacent the inner end of the bearing for collecting excess oil carried upwardly by the journal and thrown thereby against the upper surfaces of said journal box, and apertures interconnecting said inner end curved groove and said vertically disposed groove and said plurality of longitudinal grooves for guiding the excess oil collected at the inner end of said bearing into said longitudinal grooves.

WALDEMAR H. KORN.

REFERENCES CITED

The following references are of record in the file of this patent:

UNITED STATES PATENTS

| Number | Name | Date |
|---|---|---|
| 134,696 | Morris | Jan. 7, 1873 |
| 262,025 | England | Aug. 1, 1882 |
| 2,163,586 | Coleman | June 27, 1939 |

FOREIGN PATENTS

| Number | Country | Date |
|---|---|---|
| 329,936 | Great Britain | May 29, 1930 |